(12) United States Patent
Scheible et al.

(10) Patent No.: US 11,662,714 B2
(45) Date of Patent: May 30, 2023

(54) CONTROL SYSTEM FOR CONTROLLING SAFETY-CRITICAL AND NON-SAFETY-CRITICAL PROCESSES

(71) Applicant: ABB Schweiz AG, Baden (CH)

(72) Inventors: Guntram Scheible, Gorxheimertal (DE); Yauheni Veryha, Mannheim (DE)

(73) Assignee: ABB Schweiz AG, Baden (CH)

( * ) Notice: Subject to any disclaimer, the term of this patent is extended or adjusted under 35 U.S.C. 154(b) by 405 days.

(21) Appl. No.: 16/662,050

(22) Filed: Oct. 24, 2019

(65) Prior Publication Data

US 2020/0133243 A1 Apr. 30, 2020

(30) Foreign Application Priority Data

Oct. 25, 2018 (EP) .................................. 18202559

(51) Int. Cl.
*G05B 19/418* (2006.01)
(52) U.S. Cl.
CPC ............... *G05B 19/4184* (2013.01); *G05B 2219/50193* (2013.01)
(58) Field of Classification Search
CPC ............... G05B 2219/50193; G05B 19/4184
USPC ................................................. 700/82
See application file for complete search history.

(56) References Cited

U.S. PATENT DOCUMENTS

| | | | | |
|---|---|---|---|---|
| 2004/0210326 A1* | 10/2004 | Muneta | ............. | G05B 19/058 700/82 |
| 2008/0306613 A1* | 12/2008 | Muneta | ............. | G05B 19/058 700/7 |
| 2010/0256921 A1* | 10/2010 | Rauer | ............. | G01F 23/0076 702/23 |
| 2011/0098829 A1* | 4/2011 | Weddingfeld | ....... | G05B 19/052 700/79 |
| 2012/0297101 A1* | 11/2012 | Neupartl | ............. | G05B 19/058 710/110 |

FOREIGN PATENT DOCUMENTS

| | | | | |
|---|---|---|---|---|
| CN | 102725700 | * | 10/2012 | |
| DE | 3 163 390 | * | 5/2017 | |
| EP | 1683016 | * | 2/2009 | |
| EP | 3163390 A1 | * | 5/2017 | ........... G05B 19/048 |

* cited by examiner

*Primary Examiner* — Hien D Khuu
(74) *Attorney, Agent, or Firm* — Leydig, Voit & Mayer, Ltd.

(57) ABSTRACT

A control system configured to control safety-critical and non-safety-critical processes and/or plant components includes: a non-safety controller module, at least one safety controller module, and at least one condition monitoring module. The non-safety controller module is configured to control the non-safety-critical processes and/or the non-safety-critical plant components. The at least one safety controller module is configured to control the safety-critical processes and/or the safety-critical plant components. The at least one condition monitoring module is configured to perform fail-safe condition monitoring and to collect monitoring data. The non-safety controller module is configured to receive the collected monitoring data from the condition monitoring module and to pass the collected monitoring data to the safety controller module. The safety-controller module is configured to evaluate the monitoring data based on safety conditions.

12 Claims, 2 Drawing Sheets

CONTROL SYSTEM FOR CONTROLLING SAFETY-CRITICAL AND NON-SAFETY-CRITICAL PROCESSES

CROSS-REFERENCE

Priority is claimed to European Patent Application No. EP 18 202 559.3, filed on Oct. 25, 2018, the entire contents of which are hereby incorporated by reference herein.

FIELD

The present invention relates to a preferably modular control system for controlling safety-critical and non-safety-critical processes and/or plant components.

BACKGROUND

Automated control systems comprise control functions and safety functions. Critical parameters are detected by measurements and evaluated, and in case of violating a predetermined safety condition, measures such as, e.g., stopping the system may have to be taken. The safety functionalities are integrated into the system. E.g., a safety routine performed by the controller may poll in real time measured values and on violating a threshold or a specified operation range, a control signal to stop the system or to control an actuator is sent.

Such functionalities are often taken into account when designing the architecture of the system. For modifying or adding fail safe functionalities, a change of the system or the current implementation is necessary.

Therefore, an architecture for a control system may be desired that reduces modifications of a current system with respect to providing fail-safe functionality.

SUMMARY

In an embodiment, the present invention provides a control system configured to control safety-critical and non-safety-critical processes and/or plant components including: a non-safety controller module, at least one safety controller module, and at least one condition monitoring module. The non-safety controller module is configured to control the non-safety-critical processes and/or the non-safety-critical plant components. The at least one safety controller module is configured to control the safety-critical processes and/or the safety-critical plant components. The at least one condition monitoring module is configured to perform fail-safe condition monitoring and to collect monitoring data. The non-safety controller module is configured to receive the collected monitoring data from the condition monitoring module and to pass the collected monitoring data to the safety controller module. The safety-controller module is configured to evaluate the monitoring data based on safety conditions.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
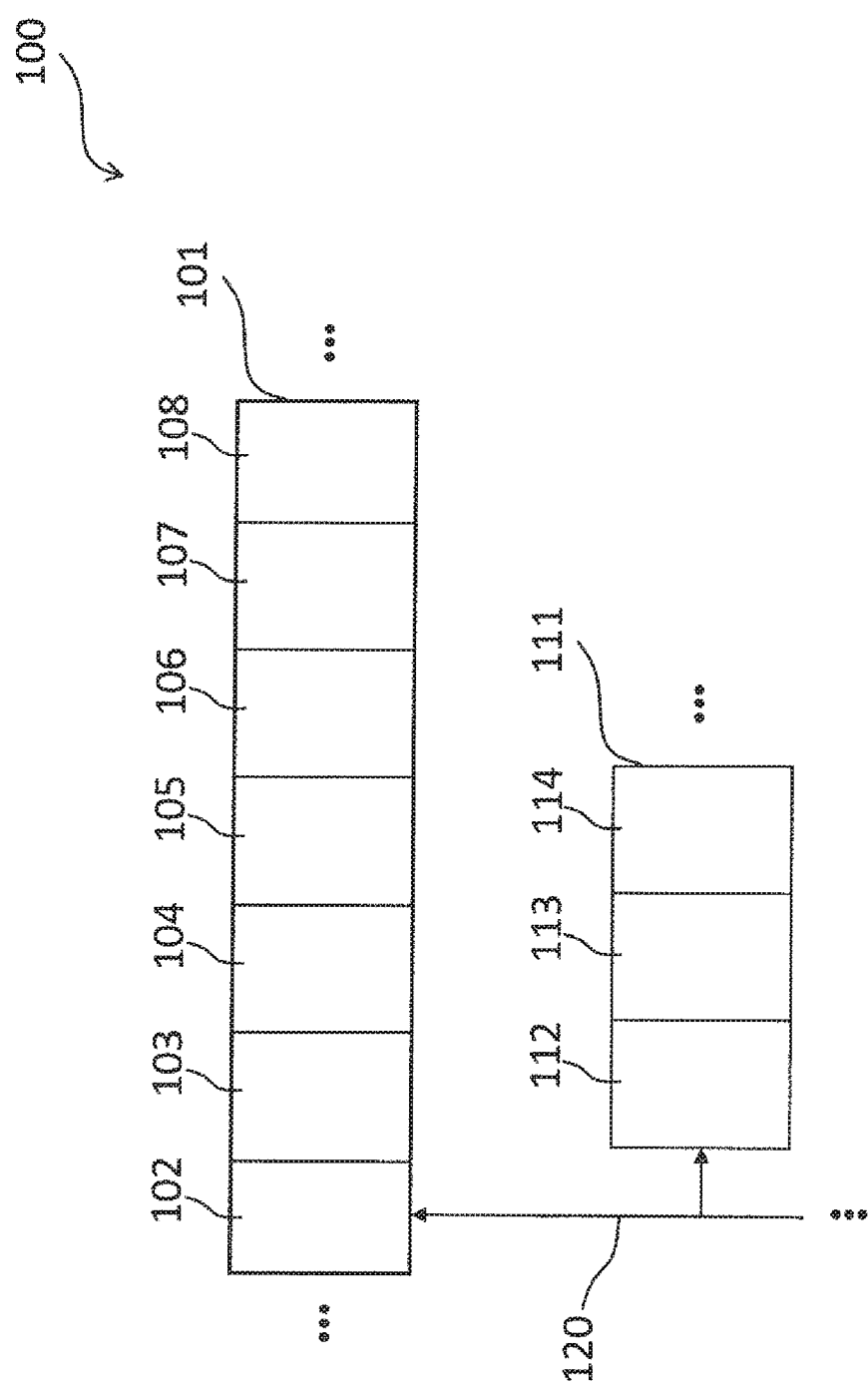
FIG. 1 schematically shows a control system with fail safe condition monitoring according to an embodiment.

Embodiments of the invention provide an architecture for a control system that reduces modifications of a current system with respect to providing fail-safe functionality. These embodiments include a control system configured to control safety-critical and non-safety-critical processes and/or plant components including: a non-safety controller module, at least one safety controller module, and at least one condition monitoring module. The non-safety controller module is configured to control the non-safety-critical processes and/or the non-safety-critical plant components. The at least one safety controller module is configured to control the safety-critical processes and/or the safety-critical plant components. The at least one condition monitoring module is configured to perform fail-safe condition monitoring and to collect monitoring data. The non-safety controller module is configured to receive the collected monitoring data from the condition monitoring module and to pass the collected monitoring data to the safety controller module. The safety-controller module is configured to evaluate the monitoring data based on safety conditions.

These embodiments include a condition monitoring module of the control system, wherein the condition monitoring module is a non-safety condition monitoring module connected to a non-safety controller module, configured to perform fail-safe condition monitoring and to communicate safety monitoring data over a non-safety interface to the non-safety controller module.

These embodiments include a non-safety controller module of the control system, wherein the non-safety controller module is connected to a condition monitoring module and a safety controller module; and wherein the non-safety controller module is configured to receive safety monitoring data from the condition monitoring module over a non-safety interface and to pass the safety monitoring data to the safety controller module.

These embodiments include a safety controller module of the control system, configured to receive safety monitoring data collected by a condition monitoring module from a non-safety controller module over a non-safety interface.

According to an embodiment, a control system is provided, which is configured to control safety-critical and non-safety-critical processes or plant components comprising: a non-safety controller module, configured to control non-safety-critical processes; at least one safety controller module, configured to control safety-critical processes and to perform safe communication; at least one condition monitoring module to perform fail-safe condition monitoring and to collect monitoring data; wherein the non-safety controller module is configured to receive the collected monitoring data from the condition monitoring module and to pass the collected monitoring data to the safety controller module; and wherein the safety-controller module is configured to evaluate the monitoring data based on safety conditions.

According to DIN VDE 0801 V or VDI/VDE 3542, the term "fail-safe" means that in the event of a fault, the system remains in a safe state or the ability of a system to enter a safe state directly. Synonymously the terms "fail-safe" or "safe" are used here.

An embodiment of a control system according to the invention for controlling safety-critical and non-safety-critical processes and/or plant components can be of a modular construction, having at least one first control unit which is provided for controlling the non-safety-critical processes and/or the non-safety-critical plant components, which is here described with the term non-safety controller module, having at least one communication coupler which is connected to the first control unit via an internal coupler bus and can be connected to further decentralized units via a field bus, and at least one second control unit is provided for controlling the safety-critical process and/or the safety-critical plant components, which is here described with the term safety controller module, wherein the second control unit has at least two processors and a first dual-port RAM for providing the safety-oriented functions, wherein the safety-control unit communicates with the non-safety control unit via the first dual-port and the internal coupler bus. In an embodiment, only one of the two processors of the safety controller module is connected to the first dual-port RAM. The non-safety control unit transmits the data from the safety control unit to the communication coupler via the internal coupler bus and a further dual-port RAM integrated in the communication coupler.

In an embodiment, the condition monitoring module receives condition monitoring signals from sensors which are passed to the non-safety controller module. The signals may be both safety-critical and non-safety-critical signals. The non-safety controller module passes the safety-critical signals to the safety controller module. The safety controller module evaluates the received safety-critical signals by performing a safe data analysis, and reacts by generating safety-oriented data telegrams and outputting the data telegrams to local and/or remote safety I/O (input/output) modules and thus controls safety-critical devices.

Due to the modular architecture, it is possible to flexibly extend existing condition monitoring systems with the safety controller module functionality to realize fail-safe condition monitoring for safety-critical applications, e.g., to safely supervise the state of centrifuges or mobile platform brakes based on the safely supervised vibration signal values.

According to an embodiment, the condition monitoring module is a non-safety condition monitoring module which is configured to additionally perform safety condition monitoring. By using standard hardware for a non-safety condition monitoring module, a cost-effective solution is provided to monitor both safety and non-safety signals. The measured signals may be digital signals which are input to a signal processor or analog signals, which are digitized, e.g. using an analog-to-digital converter. E.g., analog signals may be fast changing analog signals up to 20 kHz. The digitized signals may be pre-processed by the condition monitoring module and then be passed to the non-safety controller module.

According to an embodiment, the control system according to one of the previous claims, wherein the safety controller module is configured to provide diagnostic measures to the at least one condition monitoring module. The diagnostic measures as, e.g., periodic dynamic test signal patterns, ensure the fail-safe operation of the condition monitoring module so that the condition monitoring input channels can be used in safety applications. The test signal patterns may serve for example to detect failures in the digital circuits or to detect cross-talk errors between channels. The test signal patterns are provided to condition monitoring input channels, which are monitored and evaluated by the safety controller module. If the expected dynamic generated test signal pattern, which shall be periodically passed to the safety controller module through condition monitoring input channels and non-safety controller module parts, is not available or does not fulfil expected pre-defined dynamic signal pattern requirements, the safety reaction, like safe emergency stop, is triggered by the safety controller module, for example, using digital safety outputs on safety output modules. Cross-talk errors between channels can be detected, for example, using time-shifted (unique) dynamic test patterns for different input channels or using different test pulse frequencies. For fault exclusion, the safety controller module may additionally have to evaluate whether similar dynamic signals as the signals selected for dynamic test signal generation, e.g., signals with the same frequency, exist in the non-safety control part.

According to an embodiment, the non-safety controller module and the condition monitoring module are configured to perform the safe communication via a non-safe interface. Therefore, no additional or specialized hard- or software is necessary to communicate the data from the condition monitoring module to the non-safety controller module. The reuse of non-safety controller module communication interfaces by the safety controller module and condition monitoring system results in the reduction of design complexity for the safety controller module and the condition monitoring system by separating safety and non-safety control logic processing as well as condition monitoring in the control system. The condition monitoring system remains the non-safety part of the control system.

According to an embodiment, the control system further comprises an internal coupler bus connected to the safety controller module and the non-safety controller module; wherein the internal coupler bus is configured to provide safe communication between the safety controller module and the non-safety controller module. The safety controller module may be provided with two or more microprocessors which may provide redundancy or which may perform different tasks to supervise each other. The safety controller module may further be provided with a dual-port RAM which may be accessed by the internal coupler bus for reading and writing and by one of the microprocessors for reading and writing, thus representing the hardware buffer for exchanging data with the non-safety controller module and other modules.

According to an embodiment, the control system further comprises: a field bus; a communication coupler connected to the internal coupler bus and the field bus; and at least one communication module connected to the field bus; wherein the communication coupler is configured to communicate with the communication modules via the field bus and to communicate with the safety controller module and the non-safety controller module via the internal coupler bus. That is, the internal coupler bus connects besides the safety and non-safety controller module furthermore a communication coupler. E.g., the data from dual-port RAM of the safety controller module is put on the internal coupler bus and provided to the non-safety controller module, through the non-safety controller module these data are put on the internal coupler bus and thus provided to the communication coupler. That means the data from the safety controller module are provided to the communication coupler via the non-safety communication module using the internal coupler bus. Advantage is that a non-safety control system having initially just a non-safety controller module can easily be upgraded to a safety control system by adding a safety controller module and connecting this to the internal coupler bus, the added safety controller module does not have to take care of the data communication routines with the communication coupler but uses the communication routines of the existing non-safety controller module. In this way it is much easier to enhance a non-safety control system to become a safety control system.

The data may in the communication coupler, e.g., be converted into a field bus protocol and provided to a field bus to which further communication modules are connected. The communication coupler, the safety controller module and the non-safety controller module may, e.g., be collocated or located in one physical unit, whereas the field bus serves as connection to externals modules and devices. The bi-directional communication over the field bus may be performed using a standard field bus protocol. The safety data available on the safety controller module can be further passed through the communication interface(s), as e.g., a safety profile according to "PROFIsafe—Profile for Safety Technology on PROFIBUS DP and PROFINET IO Profile part, related to IEC 61784-3-3 Specification for PROFIBUS and PROFINET. Version 2.4, March 2007, Order No: 3.192b" or similar.

The data from the condition monitoring module can further be passed through an internal Ethernet interface and/or to serial interfaces to communication modules on other control systems.

According to an embodiment, the control system further comprises at least one safety I/O module connected to an associated communication module; wherein the system is configured to transfer safety-oriented data between the at least one safety controller module and the at least one safety I/O module. The connection may be provided by the fieldbus.

According to an embodiment, the at least one safety I/O module is an in/out module which is configured to receive safety data and to output safety control signals.

In this way, external safety I/O modules as, e.g., emergency stop devices being part of or associated to, e.g., centrifuges, mobile platform brakes or plant components can be controlled by the safety controller module.

According to an embodiment, the control system further comprises at least one non-safety I/O module connected to an associated communication module; wherein the system is configured to transfer non-safety data between the non-safety controller module and the at least one non-safety I/O module. Thus, the safety functionality is provided in parallel to the non-safety control of modules and devices, which are controlled by the non-safety controller module via the communication coupler, the field bus and the same or other communication modules.

According to an embodiment, a condition monitoring module of a control system is provided, wherein the condition monitoring module is a non-safety condition monitoring module connected to a non-safety controller module, configured to perform fail-safe condition monitoring and to communicate safety monitoring data over a non-safety interface to the non-safety controller module.

According to an embodiment, a non-safety controller module of a control system is provided, wherein the non-safety controller module is connected to a condition monitoring module and a safety controller module, and wherein the non-safety controller module is configured to receive safety monitoring data from the condition monitoring module over a non-safety interface and to pass the safety monitoring data to a safety controller module.

According to an embodiment, a safety controller module of a control system is provided, configured to receive safety monitoring data collected by a condition monitoring module from a non-safety controller module over a non-safety interface.

According to an embodiment, the control system is used as control system for a relatively large automation system, as decentralized processing facility in such a decentralized relatively large automation system or as stand-alone automation device in conjunction with the input/output modules which are coupleable in a decentralized manner, or as central automation device. The decentralization is achieved by having a modular system wherein the modules may be connected by internal buses, external buses as, e.g. a field bus, and Ethernet and/or serial interfaces.

According to an embodiment, the control system is used for controlling a mobile platform brake or a centrifuge.

Disclosed is a control system (100) with fail-safe condition monitoring in particular for controlling safety-critical and non-safety-critical processes or plant components. In an embodiment, the control system (100) comprises a non-safety controller module, configured to control non-safety-critical processes; at least one safety controller module, configured to control safety-critical processes and to perform safe communication; and at least one condition monitoring module (105, 220) to perform fail-safe condition monitoring and to collect monitoring data. The non-safety controller module (104, 220) is configured to receive the collected monitoring data from the condition monitoring module (105, 220) and to pass the collected monitoring data to the safety controller module; and the safety-controller module is configured to evaluate the monitoring data based on safety conditions.

FIG. 1 shows a control system 100 with fail safe condition monitoring according to an embodiment. FIG. 1 shows an example with two module units 101, 111. Module unit 101 comprises a condition monitoring module 105, a non-safety controller module 104, and a safety controller module 103 to monitor and evaluate non-safety and safety data, respectively. A safety I/O module 106 may receive the safety control data from the safety controller module 103 and non-safety I/O module 107 may receive the non-safety control data from the non-safety controller module 104.

Further modules may be included in module unit 101 as, e.g., a further condition monitoring module 108 and a communication coupler 102. Communication coupler 102 may provide a fieldbus connection to one or more remote module units as, e.g., remote module unit 111. Remote module unit 111 comprises, for example, communication module 112 for providing the fieldbus 120 communication and safety I/O module 113 and non-safety I/O module 114 which receive control data from, e.g., the safety controller module 103 and the non-safety controller module 104. Module units 101 and 111 may be expanded by further modules. Furthermore, several module units similar to remote module unit 111 may be attached to the module unit 101 via fieldbus 120.

Additionally, or alternatively, other communication standards as, e.g., Ethernet or serial communications, as, e.g. USB or RS 232, may be used to connect remote module units to module unit 101. The modules of the module units 101 may be located on same or different boards and may be integrated in one or more devices connected with buses and plug connections over communication and physical interfaces with each other.

A further embodiment is configured in that the remote module unit 111 also comprises a condition monitoring module, which is communicatively coupled to the non-safety controller module. In a further embodiment, a condition monitoring module may be applied as a de-centrally located unit, which is communicatively coupled to the non-safety controller module.

Figure 2:
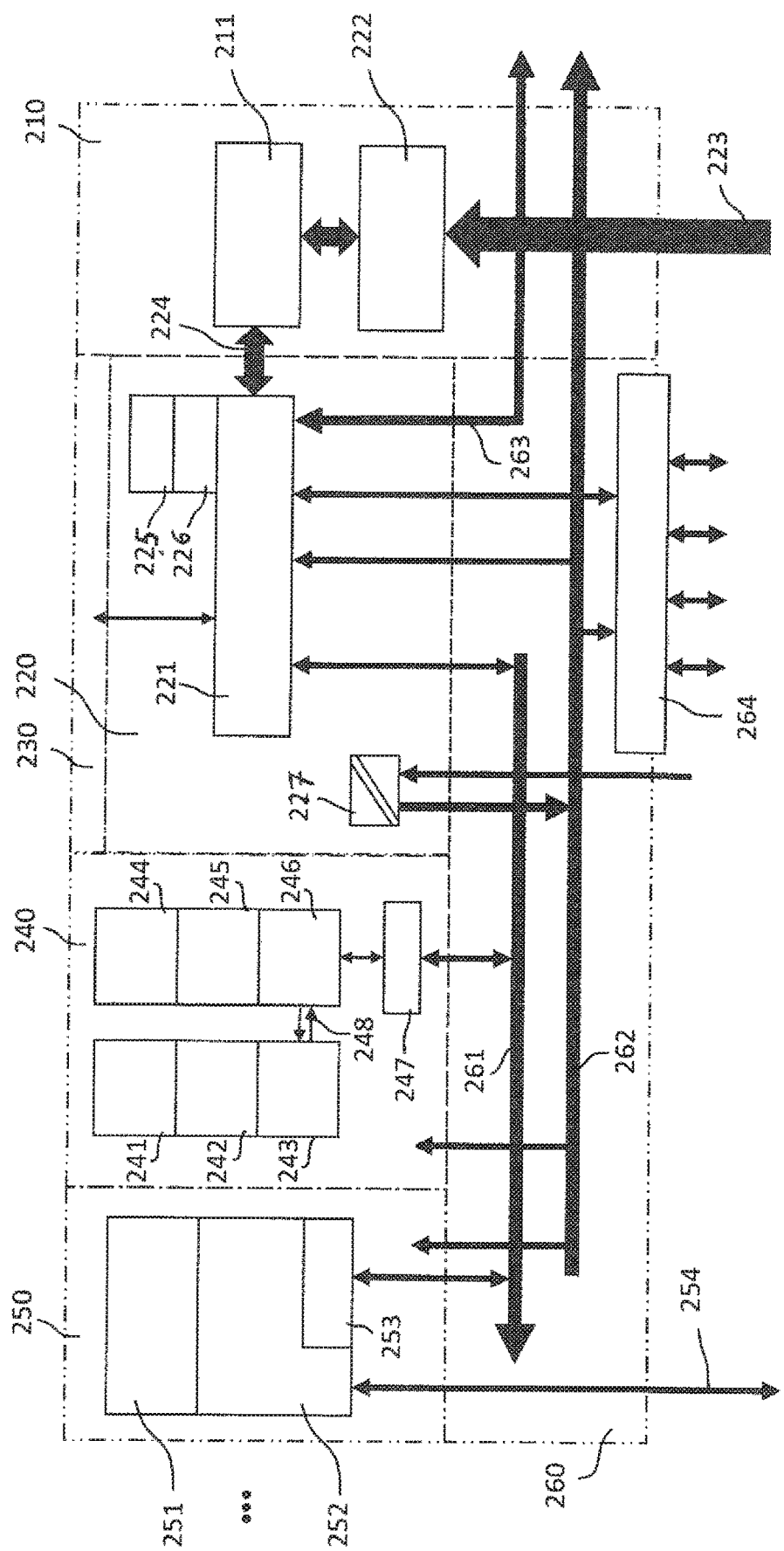
FIG. 2 schematically shows a control system architecture according to an embodiment.

FIG. 2 shows a control system architecture according to an embodiment. The condition monitoring module 210 receives condition monitoring signals from sensors via input lines 223. Input circuitry 222 buffers and prepares data from the sensors so that they can be provided as input channels to the signal processor. Input circuitry 222 may also provide one or more analog to digital converters and memory for buffering data to be provided to the signal processor 211.

Signal processor 211 further handles the input channels and communicates the data or digital signals to the microprocessor 221 of the non-safety controller module 220 via non-safety interface 224, which can be internal I/O bus 263, internal coupler bus 261 or simply a separate dedicated interface as it is shown using non-safety interface 224. Non-safety controller module 220 is clocked by clock 225, e.g. a quartz, and comprises a memory 226 for storing and handling data. Memory 226 or a further, e.g., internal memory in 221, may be available for containing the program logic. Microprocessor 221 is further connected to a user interface as, e.g. a display panel 230. Microprocessor 221 is connected to the internal I/O bus 263, the internal coupler bus 261, serial and Ethernet interfaces 264, and the power supply bus 262.

Microprocessor 221 communicates the safety data from the condition monitoring module 210 via the internal coupler bus 261 to the safety controller module 240 where it is first buffered in the dual-port RAM 247. The data is retrieved by a first microprocessor 246 of the safety controller module 240. First microprocessor 246 and second microprocessor 243 monitor each other and are synched to each other. The monitoring and synchronization is performed via interface 248.

The monitoring and synchronization mechanisms may be performed, e.g., according to "PROFIsafe—Profile for Safety Technology on PROFIBUS DP and PROFINET IO Profile part, related to IEC 61784-3-3 Specification for PROFIBUS and PROFINET. Version 2.4, March 2007, Order No: 3.192b" or similar. E.g., the CRC (cyclic redundancy check) for the telegrams to be generated are calculated by the second microprocessor 243 only and provided to the first processor 246, which adds the CRC to the telegrams and stores them in the dual-port RAM so that they are available on the internal coupler bus 261. Memories 242 and 245 are associated to the microprocessors 243 and 246, and the microprocessors 243 and 246 are clocked by clocks 241 and 244, which may be a quartz each.

The safety-oriented telegrams can be further transmitted over the further dual-port RAM 253 and the fieldbus coupler 252 integrated in the communication coupler 250 to the remote I/O modules 113, 114.

In an embodiment, the second control unit has at least two processors and a first dual-port RAM for providing the safety-oriented functions, wherein the safety-control unit communicates with the non-safety control unit via the first dual-port and the internal coupler bus. In an embodiment, only one of the two processors of the safety controller module is connected to the first dual-port RAM. The non-safety control unit transmits the data from the safety control unit to the communication coupler via the internal coupler bus and a further dual-port RAM integrated in the communication coupler.

In an embodiment, safety controller module 240 communicates over its dual-port RAM 247 and the internal coupler bus 261 with the first non-safety-critical controller 220. The non-safety-critical controller 220 transmits the data from the safety controller module 240 to the integrated dual-port RAM 253 in the fieldbus coupler 252 via the internal coupler bus 261. The communication takes place using the Black channel communication principle. Power module 224 provides the power to operate the modules over the power supply bus 262.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS INCLUDE

100 Control system
101 Module unit
102 Communication coupler
103 Safety controller module
104 Non-safety controller module
105 Condition monitoring module
106 Safety I/O module
107 Non-safety I/O module
108 Further condition monitoring module
111 Module unit
112 Communication module
113 Safety I/O module
114 Non-safety I/O module
120 Field bus
210 Condition monitoring module
211 Signal processor
220 Non-safety controller module
221 microprocessor
222 Input circuitry
223 Input lines
224 Non-safety interface 225 clock
226 memory
227 Power module
230 Display panel
240 Safety controller module
241 clock
242 memory
243 Second microprocessor
244 clock
245 memory
246 First microprocessor
247 Dual port RAM
248 interface
250 Communication coupler
252 Field bus coupler
253 Further dual port RAM
254 Field bus
261 Internal coupler bus
262 Power supply bus
263 Internal I/O bus
264 Serial and/or Ethernet interface

What is claimed is:

1. A control system configured to control safety-critical and non-safety-critical processes and/or plant components comprising:
   a non-safety controller module, configured to control the non-safety-critical processes and/or the non-safety-critical plant components;
   at least one safety controller module, configured to control the safety-critical processes and/or the safety-critical plant components;
   at least one condition monitoring module, wherein the condition monitoring module comprises at least one input channel and wherein the condition monitoring module is configured to perform fail-safe condition monitoring and to collect monitoring data from the at least one input channel including safety-critical and non-safety-critical signals;
   wherein the non-safety controller module is configured to receive the collected monitoring data from the condition monitoring module and to pass the safety-critical signals of the collected monitoring data to the safety controller module; and
   wherein the safety-controller module is configured to evaluate the collected safety-critical signals of the monitoring data received from the non-safety controller module based on safety conditions, and to provide diagnostic measures to the at least one condition monitoring module, wherein providing diagnostic measures comprises receiving dynamic test signal patterns at the at least one input channel and monitoring and evaluating the dynamic test signal patterns at the at least one input channel.

2. The control system according to claim 1, wherein the condition monitoring module is configured to additionally perform safety condition monitoring.

3. The control system according to claim 1, wherein the non-safety controller module and the condition monitoring module are configured to perform the safe communication via a non-safe interface.

4. The control system according to claim 1, wherein the control system further comprises an internal coupler bus connected to the safety controller module and the non-safety controller module; and
   wherein the internal coupler bus is configured to provide safe communication between the safety controller module and the non-safety controller module.

5. The control system according to claim 4, wherein the control system further comprises:
   a field bus,
   a communication coupler connected to the internal coupler bus and the field bus; and
   at least one serial communication interface connected to the field bus;
   wherein the communication coupler is configured to communicate with the serial communication interface via the field bus and to communicate with the safety controller module and the non-safety controller module via the internal coupler bus.

6. The control system according to claim 5, further comprising at least one safety I/O interface connected to an associated serial communication interface;
   wherein the system is configured to transfer safety data between the at least one safety controller module and the at least one safety I/O interface.

7. The control system according to claim 6, wherein the at least one safety I/O interface is configured to receive safety data and to output safety control signals.

8. The control system according to claim 1, further comprising: at least one non-safety I/O interface connected to a serial communication interface associated with the at least one non-safety I/O interface;
   wherein the system is configured to transfer non-safety data between the non-safety controller module and the at least one non-safety I/O interface.

9. A condition monitoring module of a control system according to claim 1, wherein the condition monitoring module is connected to the non-safety controller module, wherein the condition monitoring module comprises at least one input channel and is configured to perform fail-safe condition monitoring from the at least one input channel and to communicate safety monitoring data over a non-safety interface to the non-safety controller module.

10. A non-safety controller module of a control system according to claim 1,
    wherein the non-safety controller module is connected to a condition monitoring module and a safety controller module; and
    wherein the non-safety controller module is configured to receive safety monitoring data from the condition monitoring module over a non-safety interface and to pass the safety monitoring data to the safety controller module.

11. A safety controller module of a control system according to claim 1, configured to receive safety monitoring data collected by a condition monitoring module from a non-safety controller module over a non-safety interface and to provide the diagnostic measures to the at least one condition monitoring module.

12. A method comprising:
    using the control system according to claim 1 as: a control system for a relatively large automation system, as a decentralized processing facility in such a decentralized relatively large automation system, as a stand-alone automation device in conjunction with the input/output devices which are coupleable in a decentralized manner, or as a central automation device.

* * * * *